United States Patent [19]

Eto

[11] Patent Number: 4,652,942
[45] Date of Patent: Mar. 24, 1987

[54] METHOD AND SYSTEM FOR CONVERTING BINARY DATA USING BIT-DIVIDED ENCODING

[75] Inventor: Yoshizumi Eto, Sagamihara, Japan

[73] Assignees: Hitachi, Ltd.; Hitachi Denshi Kabushiki Kaisha, both of Tokyo, Japan

[21] Appl. No.: 756,668

[22] Filed: Jul. 19, 1985

[30] Foreign Application Priority Data

Sep. 19, 1984 [JP] Japan .................................. 59-194719

[51] Int. Cl.<sup>4</sup> ........................... G11B 5/02; G11B 5/09; H03M 1/00
[52] U.S. Cl. ........................................ 360/32; 360/40; 375/19; 340/347 DD
[58] Field of Search ........................ 360/40, 32, 33.1; 375/17-19; 340/347 DD

[56] References Cited

U.S. PATENT DOCUMENTS

| | | | |
|---|---|---|---|
| 3,754,237 | 8/1973 | de Laage de Meux | 340/347 DD |
| 3,902,117 | 8/1975 | Sheppard | 375/19 |
| 4,408,189 | 10/1983 | Betts et al. | 375/19 X |
| 4,462,050 | 7/1984 | Cox | 360/32 |
| 4,531,153 | 7/1985 | Watanabe | 358/141 |

Primary Examiner—Raymond F. Cardillo
Assistant Examiner—Alyssa H. Bowler
Attorney, Agent, or Firm—Antonelli, Terry & Wands

[57] ABSTRACT

A video signal to be recorded on a recording medium used in a video tape recorder or optical disk recorder is digitized, distributed into several bit sets, and then subjected to separate processings or converting operations. The bit sets are merged into a data word with the same number bits as of the original digital data and, after being processed for bit inversion at a certain data interval, it is recorded on the recording medium. Data words retrieved from the recording medium are processed for bit inversion and inverse conversion in a reverse order with respect to the recording process, and a high quality video signal including a smaller number of bit errors can be reproduced.

8 Claims, 9 Drawing Figures

FIG. 2a PRIOR ART

| CODE TYPE | AVERAGE ERROR BITS IN INVERSELY CONVERTED DATA WORD | AVERAGE ERROR LEVEL | PROBABILITY OF ERROR EXISTING IN INVERSELY CONVERTED HIGH-ORDER 4 BITS |
|---|---|---|---|
| NATURAL BINARY | 1.00 | 31.88 | 0.50 |
| DSVCC | 3.79 | 50.27 | 0.96 |

FIG. 2b PRIOR ART

| CODE TYPE | DIFFERENCE OF DIGITAL SUMS AT 1-LEVEL DATA INTERVAL | | DIFFERENCE OF DIGITAL SUMS AT 2-LEVEL DATA INTERVAL | |
|---|---|---|---|---|
| | MAX | MIN | MAX | MIN |
| NATURAL BINARY | 12 | 0 | 10 | 2 |
| DSVCC | 2 | 0 | 2 | 0 |

FIG. 3a

| | AVERAGE ERROR BITS IN INVERSELY CONVERTED DATA WORD | AVERAGE ERROR LEVEL | PROBABILITY OF ERROR EXISTING IN INVERSELY CONVERTED HIGH-ORDER 4 BITS |
|---|---|---|---|
| FIRST EMBODIMENT | 2.00 | 37.18 | 0.50 |
| SECOND EMBODIMENT | 2.25 | 36.88 | 0.50 |
| THIRD EMBODIMENT | 1.50 | 36.88 | 0.50 |

FIG. 3b

| | DIFFERENCE OF DIGITAL SUMS AT 1-LEVEL DATA INTERVAL | | DIFFERENCE OF DIGITAL SUMS AT 2-LEVEL DATA INTERVAL | |
|---|---|---|---|---|
| | MAX | MIN | MAX | MIN |
| FIRST EMBODIMENT | 2 | 0 | 2 | 0 |
| SECOND EMBODIMENT | 2 | 2 | 4 | 0 |
| THIRD EMBODIMENT | 8 | 0 | 6 | 2 |

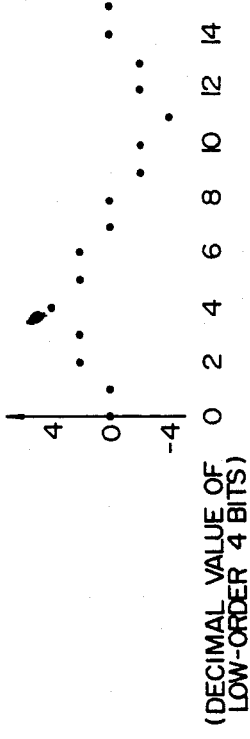
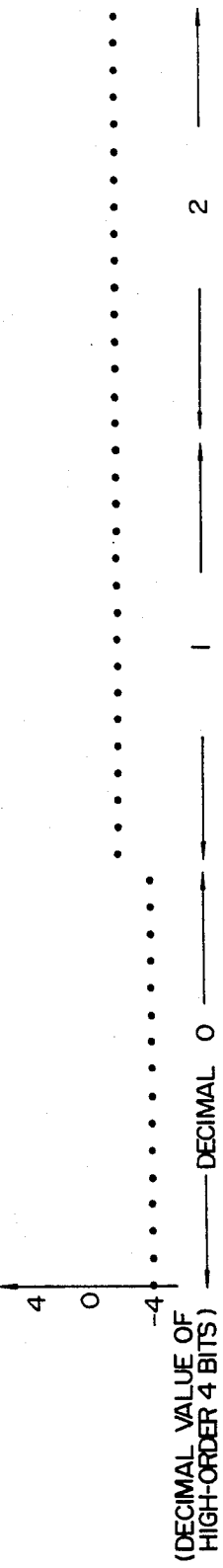
FIG. 4a
DIGITAL SUM OF CONVERTED LOW-ORDER 4 BITS
FIG. 4b
DIGITAL SUM OF CONVERTED HIGH-ORDER 4 BITS

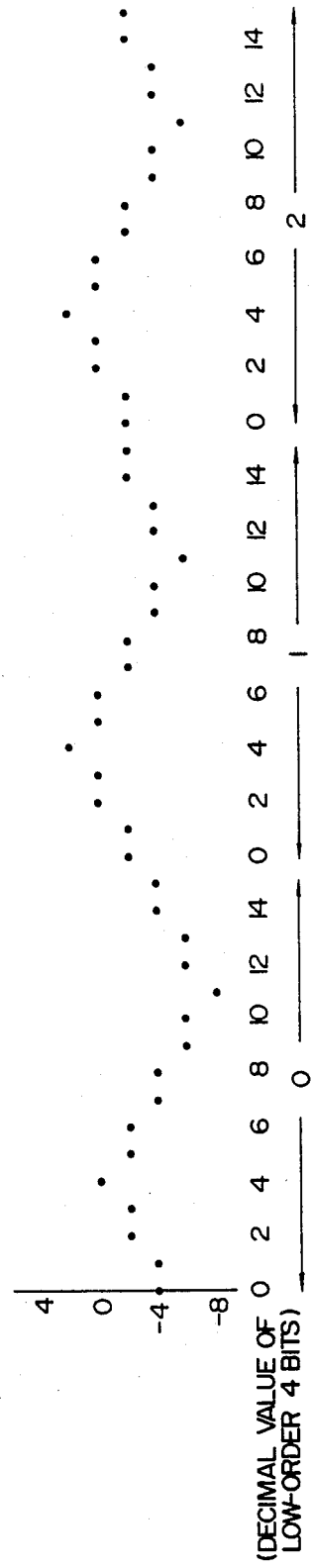

METHOD AND SYSTEM FOR CONVERTING BINARY DATA USING BIT-DIVIDED ENCODING

BACKGROUND OF THE INVENTION

This invention relates to a method and system for converting a highly autocorrelative digital video signal so that it can be recorded magnetically or optically on a recording medium which is weak in recording a d.c. signal or very low frequency signal.

Generally, in recording or reproducing digital codes, the d.c. component of the signal is often lost during the recording or reproducing process. To alleviate this impropriety a technique for converting (modulating) digital codes into a signal with little d.c. component needs to be applied in advance of recording. For example, in the digital VTR industry, there is known the method of reducing the d.c. component of a digital code signal by utilizing the correlation of pictures. A technique of inverting every second sample among sampled data is described in an article entitled "An Analytical Approach to the Standardization of Digital Videotape Recorders" by Jürgen K. R. Heitmann, SMPTE Journal, March 1982, pp. 230. U.S. Pat. No. 4,531,153 discloses a method which consists of two procedures (a) and (b) as follows.

(a) A sampled video signal digitized into a code is converted into another code by the table which is an ascending-order list of CDS (Code word Digital Sum), i.e., each bit of code is evaluated to be $+1$ for "1" or $-1$ for "0" and all bit values are summed up for each possible code. For example, when a single pixel of picture is expressed in an 8-bit code, there are a total of 256 possible codes including 1, 8, 28, 56, 70, 56, 28, 8, and 1 codes having CDS values of $-8, -6, -4, -2, 0, 2, 4, 6,$ and 8, respectively. 8-bit codes of 256 kinds derived from the video signal are evaluated from 0 to 255 in decimal and converted by 1-to-1 correspondence into a Digital Sum Variation Check Code (DSVCC) of 256 kinds listed in ascending order. The variation in the amplitude of the video signal for each pixel causes little change in the CDS value of each converted code.

(b) The converted code signal is recorded on the tape in a period providing high correlation, e.g., by inverting the polarity of the recording signal at every other pixel. If two adjoining pixels in the input video signal are coded with the same CDS, two codes converted for the two pixels by this process have their d.c. components cancelling each other and they are eliminated. If two input codes have similar values, if not equal, their d.c. components are reduced by this process and made suitable for digital recording on the magnetic tape. However, although the method of the above patent application is effective for reducing the d.c. component in the code signal, the system is much affected by erroneous coding which would occur during the recording or reproducing process. In this respect, a video signal level having a value of '96' is to be converted into a binary code of '00011101' with DSV=0 as exemplified in the above patent publication. Let it be assumed that the 8th bit (LSB) is erroneously converted to "0" in the recording-reproducing process, resulting in '00011100'. This binary code corresponds to the original code with a value of '46'. Decimal values '96' and '46' are expressed in binary as '01100000' and '00101110', respectively, and they differ in bits 2, 5, 6 and 7. Namely, a single bit error in the recording-reproducing process will result in a 4-bit error through the inverse conversion for the DSVCC code following the reproduction process. An error at the 8th bit (LSB) of a natural binary code creates a minimal 1-level error against the maximum level of '256', whereas an erroneous value of '46' against a correct value of '96' results in a 50-level error (96−46=50). On assumption that original codes take values '0' through '255' with the same probability and, after conversion into DSVCC codes as described in the above patent application, are rendered erroneous at one of eight bits with a certain equal probability during the recording-reproduction process, calculation was conducted to evaluate on the average single bit errors of DSVCC in terms of the number of bits of the original codes and to evaluate corresponding error levels on the average. The result of calculation listed in the table (lower row) of FIG. 2a indicates that a single bit error in the DSVCC implies a 3.79-bit error with an error level of 50.27 in terms of the original code. If, on the other hand, the original natural binary code is recorded and reproduced without code conversion, a single bit error does not change its significance throughout the process and its mean error level is 31.88, i.e., $(128+64+32+16+8+4+2+1)/8$, as shown in FIG. 2a (upper row). Accordingly, the method disclosed in the above patent application involves the exacerbation of bit error degradation during the process, which amounts to 3.79 times the number of bits and 1.6 times in the error level as compared with the direct code handling system, in exchange for the reduction of the d.c. component in the recording signal.

Usually, error correction codes are used in digital video recording systems for the purpose of alleviating the influence of bit errors occurring in the recording or reproducing process. In most cases the error correction process takes place for the entirety of the 8-bit code of the video signal. Because of greater significance of a higher-order bit error acting upon the picture quality, error correction is stressed on the higher-order bits in some cases. An ultimate case is where a high grade error correction is implemented only for the high-order 4 bits, with the low-order 4 bits being left uncorrected. A question arising in this case is that when the input video signal is digitized into a code, which is appended by an error correction code and recorded in the DSVCC coding system, which is followed, after reproduction, by inverse conversion to the original code and then the error correction process, how an error occurring in the recording or reproducing process influences the high-order 4 bits of the inversely converted code. Another matter to be considered is about the probability of error at any of the high-order 4 bits of the inversely converted code when any one of 8 bits has failed in the recording or reproducing process. In the preceding example of the input code having a decimal value of '96' which is spoiled at the LSB with a result of inverse conversion as '46', the high-order 4-bit block includes an error bit at bit 2. The same calculation is conducted for the remaining 7 bits of the binary code '00011101' (which has been obtained by the conversion from decimal 96). The result of calculation for the 256 8-bit codes (decimal 0–255) is listed in the table of FIG. 2a (rightmost column). Direct handling of the natural binary code in the recording-reproduction process causes an equal probability of 0.5 for the occurrence of a bit error in the high-order 4-bit block and in the low-order 4-bit block, whereas the DSVCC coding system mentioned above causes the higher-order 4-bit block to include bit error(s) with a probability of 0.96. In other words, a bit error occuring at any bit position of an 8-bit code during the recording-reproduction process will result in bit error(s) in the high-order 4-bit block of an inversely converted code with a 96% probability. Generally, error recovery by the error correction code system is nullified when the number of data words including bit error(s) reaches a certain proportion, and therefore the range of error correction by the DSVCC coding system is narrowed with the increase in the number of error bits.

SUMMARY OF THE INVENTION

An object of this invention is to provide a binary data coding system which impedes the exacerbation of bit errors created in the recording-reproduction processes by the successive inverse conversion process, while retaining the feature of the coding system that adjacent values of data words have little change in their digital sums.

Another object of this invention is to provide a digital recording system for magnetic or optical recording of a video signal which reduces the d.c. component of the digital signal, thereby decreasing the error rate of the reproduced digital signal.

Still another object of this invention is to provide a video signal recording/reproduction system with an enhanced error correcting ability by recording and reproducing the video signal on a magnetic video tape through the process of inverting the polarity of the digital video signal in a period providing a high correlation of pixel data.

This invention has the feature that each digital word is divided into several blocks of bits, each block is processed separately, the processed blocks are merged into a data word, and the polarity of composite data words is inverted in a period providing a high autocorrelation of the video signal.

BRIEF DESCRIPTION OF THE DRAWINGS

FIGS. 2a and 2b are tables representing the performance evaluation for the conventional digital data coding system without code conversion and with code conversion based on Digital Sum.

FIGS. 3a and 3b are tables presenting the performance evaluation for the inventive code conversion system.

FIGS. 4a, 4b and 4c are graphs showing the variation of digital sum against the change in the magnitude of the signal codes.

DESCRIPTION OF THE PREFERRED EMBODIMENTS

Figure 1:
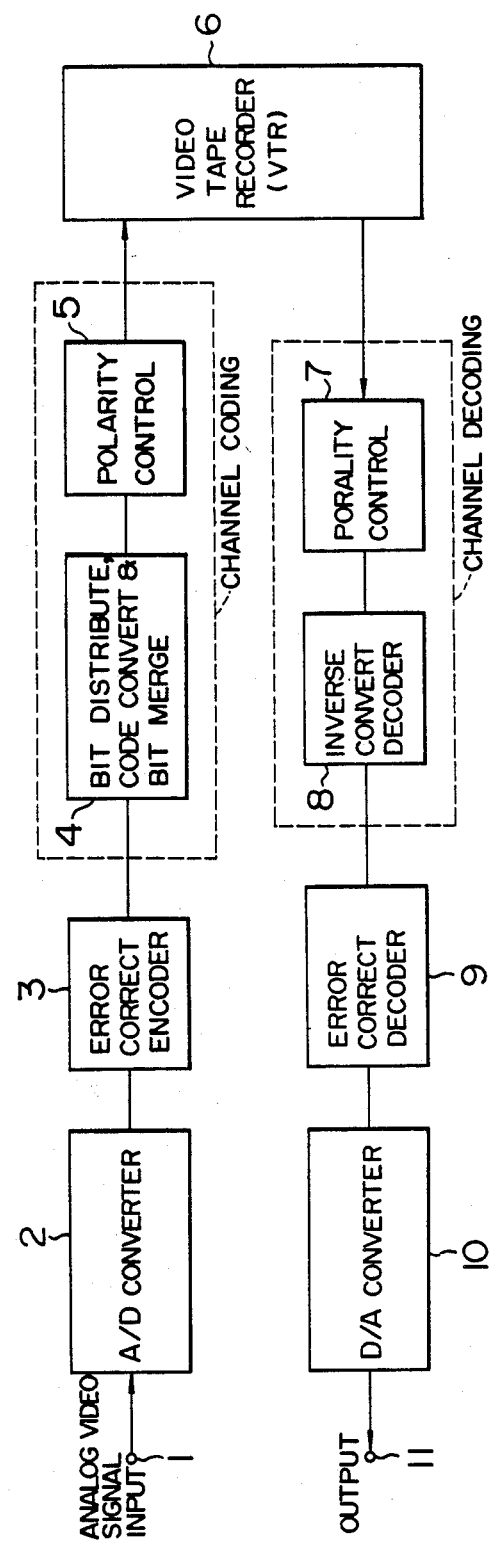
FIG. 1 is a block diagram showing the video signal recording-reproduction system based on the inventive code conversion system.

In FIG. 1 showing the video signal recording-reproduction system incorporating the inventive code converter, the analog video signal received at the terminal 1 is converted into 8-bit digital data by the A/D converter 2 and then appended with error correction codes by the error correction encoder 3. The digital data is encoded into a data form suitable for the recording channel. Namely, a set of 8-bit digital data is split into high-order 4 bits and low-order 4 bits and converted separately into new high and low-order 4-bit sets by the code converter 4 incorporating a ROM table having an 8-bit input and an 8-bit output. The above error correction codes appended by the error correction encoder 3 may be out of the conversion, or they may be under any other processing. The converted data pair is subjected to polarity inversion by the polarity controller 5 in a period providing a high correlation of the original data.

The system arrangement further includes a VTR 6 for recording and reproducing video data, another polarity controller 7 operating in synchronism with the polarity controller 5, an inverse converter 8 including a ROM table for inversely converting 4-bit sets of reproduced 8-bit data, an error correction decoder 9 for correcting bit errors created in the VTR, and a D/A converter 10 for reproducing the original analog video signal at the terminal 11. The error correction encoder 3 and error correction decoder 9 may be placed between the functional blocks 5 and 6, and between 6 and 7, respectively, so that the error correcting process is implemented for data with a reduced d.c. component.

Figure 5:
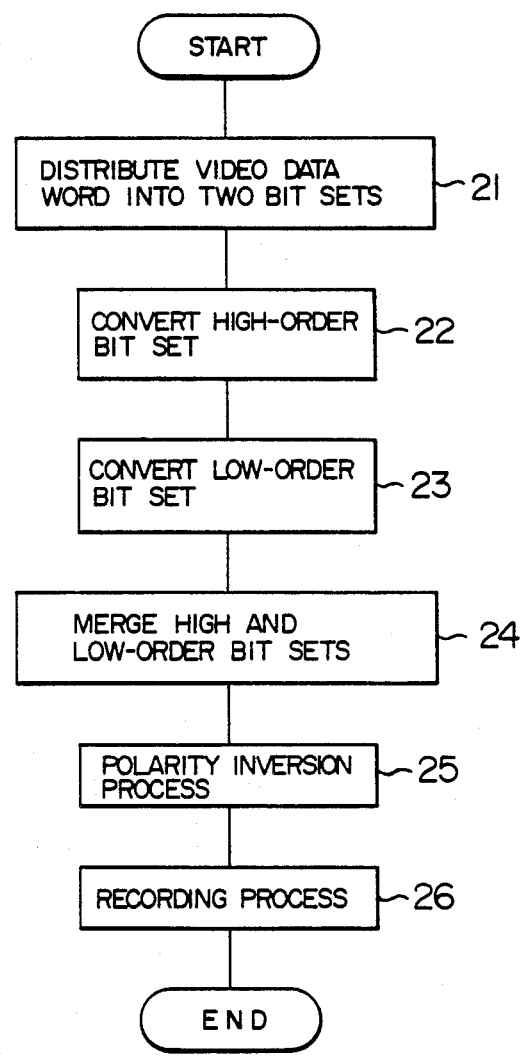
FIG. 5 is a flowchart showing the operating procedure according to this invention.

The following describes the processing for distributing a set of 8-bit data into high-order and low-order 4-bit blocks, converting these blocks separately into a pair of 4-bit data, and merging the data pair into a set of 8-bit data, as shown in the flowchart of FIG. 5. It should be noted that in the above operating parameters 8 bits, 4 bits and 2 blocks are given as an example, and this invention is not limited to these values. Instead, the number of high-order bits may be increased to enhance the error correcting ability, the data word of 9 bits or 10 bits may be used to upgrade the resolution of the video signal, or the data word may be divided into three or more bit blocks.

An important factor of the inventive method is the rule of conversion for the split 4-bit data blocks. In the conventional DSVCC coding system, the converted video data word has a digital sum which varies in the order of $-8$, $-6$, $-4$, $-2$, 0, 2, 4, 6, and 8 as the magnitude of the original video data word increases. This conversion scheme is effective for minimizing the digital sum variation against the change in the video signal level. To utilize this advantage, the embodiment of this invention employs the DSVCC coding system for the high-order 4 bits as shown by step 22 in the flowchart. In the following conversion table, values enclosed in parentheses donote decimal values of the original 4-bit data.

TABLE 1

| DSVCC conversion for high-order 4 bits | | |
|---|---|---|
| Original code | Converted code | Digital sum |
| 0000(0) → | 0000(0) | −4 |
| 0001(1) → | 0001(1) | −2 |
| 0010(2) → | 0010(2) | −2 |
| 0011(3) → | 0100(4) | −2 |
| 0100(4) → | 1000(8) | −2 |
| 0101(5) → | 0011(3) | 0 |
| 0110(6) → | 0101(5) | 0 |
| 0111(7) → | 0110(6) | 0 |
| 1000(8) → | 1001(9) | 0 |
| 1001(9) → | 1010(10) | 0 |
| 1010(10) → | 1100(12) | 0 |
| 1011(11) → | 0111(7) | 2 |
| 1100(12) → | 1011(11) | 2 |
| 1101(13) → | 1101(13) | 2 |
| 1110(14) → | 1110(14) | 2 |
| 1111(15) → | 1111(15) | 4 |

When the high-order 4 bits vary from '0000' (decimal 0) through '1111' (decimal 15), the corresponding digital sum varies in the order of −4, −2, 0, 2 and 4. For example, for a string of decimal values 0, 1, 2, ..., and so on, the digital sum varies simply as −4, −2, −2, ..., and so on as shown in FIG. 4b. In calculating the digital sum, the correspondence of "0"=−1 and "1"=+1 may be replaced with the correspondence "0"=+1 and "1"=−1.

Next, the low-order 4-bit block is converted so that its digital sum varies progressively with the variation of the 4-bit value by processing step 23 in the flowchart. The conversion table for the low-order 4 bits is shown in the following table.

TABLE 2

Conversion of low-order 4-bits to the code with continuous variation of digital sum

| Original code | | Converted code | Digital sum |
|---|---|---|---|
| 0000(0) | → | 1010(10) | 0 |
| 0001(1) | → | 1100(12) | 0 |
| 0010(2) | → | 1101(13) | 2 |
| 0011(3) | → | 1110(14) | 2 |
| 0100(4) | → | 1111(15) | 4 |
| 0101(5) | → | 1011(11) | 2 |
| 0110(6) | → | 0111(7) | 2 |
| 0111(7) | → | 1001(9) | 0 |
| 1000(8) | → | 0110(6) | 0 |
| 1001(9) | → | 1000(8) | −2 |
| 1010(10) | → | 0100(4) | −2 |
| 1011(11) | → | 0000(0) | −4 |
| 1100(12) | → | 0001(1) | −2 |
| 1101(13) | → | 0010(2) | −2 |
| 1110(14) | → | 0011(3) | 0 |
| 1111(15) | → | 0101(5) | 0 |

FIG. 4a shows digital sums distributed on a sinusoidal profile along the input decimal values 0 through 15. The high-order and low-order bit blocks are merged into an 8-bit data word, whose digital sum is the sum of digital sums of both 4-bit blocks. A slight varation in the original digital video signal causes little change in the digital sum of the converted 8-bit data shown by FIG. 4c.

Using these conversion tables, an original 8-bit data '10000110' (decimal 134), for example, is converted into '1001' for the high-order block '1000' and '0111' for the low-order block '0110', and is then merged into '10010111' (decimal 151) by processing step 24 in the flowchart. The polarity of the bit data is inverted at a certain word interval, and the signal is recorded on the tape. If a bit error from "0" to "1" occurs at bit 5 in the recording-reproducing process to reproduce data word '10110111', the high-order block '1011' is converted back to '1100' by the reverse consultation of Table 1 and the low-order block '0111' is converted back to '0110' by the reverse consultation of Table 2, and finally these blocks are merged into '11000110' (decimal 198). Comparing the reproduced data word with the original one indicates a bit error at bit 2 in the high-order bit block with error level of '64' (198−134=64). Namely, a bit error in the high-order bit block created in the recording-reproducing process remains as a bit error(s) within the high-order bit block after the inverse conversion process. Likewise, bit error(s) created in the low-order bit block in the recording-reproducing process remain within the low-order bit block after the inverse conversion process. The influence of a bit error at any position of the 8-bit data word on the data word after inverse conversion based on the foregoing code converting system was evaluated statistically for a total of 2048 (i.e., 256×8) cases, and it is listed as a result of the first embodiment in FIG. 4a. The result shows in all aspects that the influence of bit error on the reproduced signal according to this invention is alleviated as compared with the conventional DSVCC coding system.

As mentioned previously, the conventional DSVCC coding system is advantageous in producing little change in the digital sum of the converted data word against a moderate variation of the video signal level (the lateral position in FIG. 4b), which enables the reduction of the d.c. component by the polarity inverting process at every pixel.

FIG. 3b shows the variation of the digital sum of the converted data word caused by a 1-level change and 2-level change in the original data word resulted from the code conversion of the first embodiment. Since these values are dependent on the magnitude of the original data word, the maximum and minimum values of each case are listed. If the natural binary code is used for the recording-reproduction process as in the conventional system, a 1-level variation from '01111111' (decimal 127) to '10000000' (decimal 128) causes a maximum change in the digital sum from 6 to −6, i.e., 12, as has been shown in row 1, column 1 of FIG. 2b. A 1-level variation from '0111101' (decimal 125) to '0111110' (decimal 126) causes a minimum change, i.e., no change, in digital sum as shown in column 2 of FIG. 2b. Likewise, a 2-level variation from '0111110' (decimal 126) to '10000000' (decimal 128) causes a maximum change from 4 to −6, i.e., 10, in digital sum as shown in column 3 of FIG. 2b, while a 2-level variation from '01111100' (decimal 124) to '01111110' (decimal 126) causes a minimum change of 2 in digital sum as shown in column 4 of FIG. 2b.

In the conventional DSVCC coding system, the data word increases its magnitude along a string of digital sums −8, −6, −4, −2, 0, 2, 4, 6, and 8, and therefore the change in the digital sum occurs at the boundary of two contiguous data words having different digital sums. For example according to the above-mentioned patent application (FIG. 4A), the data word having a magnitude of '8' is located at the end of the word group having a digital sum of −6, and the successive data words having magnitudes of '9', '10' and '11' are located at the first, second and third positions for the digital sum −4. Accordingly, a 1-level variation in the original video data word from '8' to '9' causes a maximum change of 2 in the digital sum, while the variation from '9' to '10' causes a minimum change of zero as shown in row 2, columns 1 and 2 of FIG. 2b. Likewise, a 2-level variation of the original data word from '8' to '10' causes a maximum change of 2 in the digital sum, and the variation from '9' to '11' causes a minimum change of zero.

Whereas, in the foregoing first embodiment of this invention, when the original data word varies, for example, from '01001111' (decimal 79) to '01010000' (decimal 80) with a change of 2 in digital sum of the high-order 4 bits from '1000' to '0011', there is no change in the digital sum of the low-order 4 bits from '0101' to '1010'. Namely, when a 1-level variation in the original data word causes a change in the high-order 4-bit block, the digital sum of the converted data word will vary at a maximum of 2 or minimum of 0 as shown in row 1, columns 1 and 2 of FIG. 3b. When the original data word varies only in the low-order 4-bit block, a 1-level variation causes digital sum of the converted data word to vary at a maximum of 2 or minimum of 0. Likewise, a 2-level variation in the original data word causes a change at a maximum of 2 and minimum of 0 in the digital sum of the converted word as shown in row 1, columns 3 and 4 of the FIG. 3b. Accordingly, the variation of digital sum resulting from a 1-level or 2-level change in contiguous video data words by the coding system of the first embodiment is identical to the case of the conventional DSVCC coding system shown in row 2 of FIG. 2b, and the same effect of d.c. component reduction is accomplished by the polarity inversion at every pixel data word, and yet the influence on bit errors shown in row 1 of FIG. 3a is alleviated as compared with the conventional DSVCC coding system. Although the digital sum of the code conversion table of the first embodiment listed in Table 2 begins with 0, increases and then decreases into negative values, and returns to 0, the converting scheme can be modified so that digital sum begins with 0, decreases into negative values and then increases back to 0.

As the second embodiment of this invention, the low-order 4-bit block is converted into the alternating binary code according to Table 3.

TABLE 3

| Conversion to the alternating binary code | | |
|---|---|---|
| Original code | Converted code | Digital sum |
| 0000(0) → | 0000(0) | −4 |
| 0001(1) → | 0001(1) | −2 |
| 0010(2) → | 0011(3) | 0 |
| 0011(3) → | 0010(2) | −2 |
| 0100(4) → | 0110(6) | 0 |
| 0101(5) → | 0111(7) | 2 |
| 0110(6) → | 0101(5) | 0 |
| 0111(7) → | 0100(4) | −2 |
| 1000(8) → | 1100(12) | 0 |
| 1001(9) → | 1101(13) | 2 |
| 1010(10) → | 1111(15) | 4 |
| 1011(11) → | 1110(14) | 2 |
| 1100(12) → | 1010(10) | 0 |
| 1101(13) → | 1011(11) | 2 |
| 1110(14) → | 1001(9) | 0 |
| 1111(15) → | 1000(8) | −2 |

In the alternating binary code, every pair of contiguous data values has a difference of 2 in their digital sums. The characteristics of code conversion by application of the DSVCC coding system to the high-order 4 bits and the alternating binary conversion system to the low-order 4 bits are shown in row 2 of FIGS. 3a and 3b.

As the third embodiment of this invention, the high-order 4-bit block is converted by the DSVCC coding system, while the low-order 4-bit block is left in the natural binary code, with its characteristics shown in row 3 of FIGS. 3a and 3b.

The digital sum variation characteristics of the second and third embodiments shown in FIG. 3b are inferior to the case of the conventional DSVCC coding system shown in row 2 of FIG. 2b, but the former is superior in the bit error characteristics, i.e., the average number of error bits and the probability of bit error in the high-order 4-bit block shown in FIG. 3a.

As a further embodiment, the high-order 4-bit block may be treated by the coding system used for the low-order 4-bit block in the first and second embodiment, instead of using the DSVCC coding system.

The video signal mentioned in the above description includes the chrominance signal (I or Q) or luminance signal (Y), or the composite signal of these, any of which is suitable for being processed by the inventive code converting system. The video signal may be subjected to any form of analog-to-digital conversion including PCM, provided that the correlation of data magnitude is not impaired.

What is claimed is:

1. A binary data conversion method for converting a highly redundant signal having a plurality of data words comprising the steps of:
    (a) dividing individual data words into a plurality of bit sets;
    (b) independently converting each of said plurality of bit sets derived from said data words;
    (c) merging said plurality of converted bit sets into a plurality of new data words; and
    (d) inverting the polarities of selective ones of said plurality of new data words.

2. A binary data conversion method according to claim 1, wherein said converting step comprises the steps of distributing each of said data words into a high-order bit set and a low-order bit set, converting said high-order bit sets into other bit sets by rearranging bit strings so as to have a digital sum which varies monotonically with the variation of the magnitude of said bit sets, and converting said low-order bit sets into still other bit sets by rearranging bit strings so as to have a digital sum which varies with a sinusoidal profile with the variation of the magnitude of said bit sets.

3. A binary data conversion method according to claim 1, wherein said plurality of autocorrelative data words are derived from a line-scanned video signal through a digitizing process and said data words produced by said polarity inverting process are recorded with a magnetic tape recorder.

4. A binary data conversion method according to claim 1, wherein each of said original data words is an 8-bit code which is split into two 4-bit codes, said polarity inversion taking place at every bit of said merged data words.

5. A digital recording method for a video signal comprising the steps of:
    (a) digitizing a line-scanned video signal into data words each made up of high-order and low-order bit sets;
    (b) converting said high-order bit set into a code with the digital sum thereof varying monotonically with the variation of the magnitude of the decimal notation of said high-order bit set;
    (c) converting said low-order bit set into another code with the digital sum thereof varying with a sinusoidal profile with the variation of the magnitude of the decimal notation of said low-order bit set;
    (d) merging said converted high-order and low-order bit sets; and
    (e) inverting every bit of said merged data words at every other word.

6. A video signal recording system comprising:
    (a) a first device which receives a high-order bit set of a binary video data and converts said bit set into a code with the digital sum thereof varying monotonically with the variation of the magnitude of the decimal notation of said high-order bit set;
    (b) a second device which receives a low-order bit set of said binary video data and converts said bit set into a code with the digital sum thereof varying along a sinusoidal curve with the variation of the magnitude of the decimal notation of said low-order bit set;
    (c) a third device which inverts bits of said converted high-order and low-order bit sets at every other data word; and (d) a fourth device for recording said data words produced by said third device onto a recording medium.

7. A video signal recording system according to claim 6 further comprising a fifth device for inverting bits of data words retrieved from said recording medium at every other data words, and a sixth device which receives data from said fifth device and performs conversion for the high-order and low-order bit sets in a reverse manner with respect to the code conversions by said first and second devices.

8. A video signal recording system according to claim 6, wherein said second device includes means for transforming said low-order bit set having sixteen binary values from 0000 to 1111 corresponding to decimal 0 to 15, respectively into binary values 1010, 1100, 1101, 1110, 1111, 1011, 0111, 1001, 0110, 1000, 0100, 0000, 0001, 0010, 0011, 0101, respectively.

* * * * *